US012087092B2

(12) United States Patent
George et al.

(10) Patent No.: US 12,087,092 B2
(45) Date of Patent: Sep. 10, 2024

(54) PILOT SAFETY SYSTEM WITH CONTEXT-SENSITIVE SCAN PATTERN MONITORING AND ALERTING

(71) Applicant: Rockwell Collins, Inc., Cedar Rapids, IA (US)

(72) Inventors: Christopher L George, Winchester, VA (US); Arjun Harsha Rao, Marion, IA (US); Timothy J. Wittkop, Marion, IA (US); Wade T. Johnson, Cedar Rapids, IA (US); Peggy Wu, Ellicott City, MD (US); Michael P. Matessa, Ben Lomond, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/734,860

(22) Filed: May 2, 2022

(65) Prior Publication Data

US 2022/0392261 A1   Dec. 8, 2022

Related U.S. Application Data

(60) Provisional application No. 63/196,923, filed on Jun. 4, 2021.

(51) Int. Cl.
*G06V 40/19* (2022.01)
*B64D 45/00* (2006.01)
(Continued)

(52) U.S. Cl.
CPC ............ *G06V 40/19* (2022.01); *B64D 45/00* (2013.01); *G06T 7/70* (2017.01); *G06V 40/197* (2022.01);
(Continued)

(58) Field of Classification Search
CPC ...... G06V 40/19; G06V 40/197; B64D 45/00; B64D 2045/0075; G08G 5/0021; G08G 5/003; G06T 2207/30201
See application file for complete search history.

(56) References Cited

U.S. PATENT DOCUMENTS 6,480,763 B1 * 11/2002 Lappos ................ G08G 5/0095
  701/16
6,974,414 B2 * 12/2005 Victor .................. G06V 20/597
  340/576
(Continued)

FOREIGN PATENT DOCUMENTS

EP              3776347 A1      2/2021
WO      WO-2020256764 A1 *     12/2020   ............ B60W 40/08

OTHER PUBLICATIONS

Lounis C, Peysakhovich V, Causse M. Visual scanning strategies in the cockpit are modulated by pilots' expertise: A flight simulator study. PLoS One. Feb. 18, 2021;16(2):e0247061. doi: 10.1371/journal.pone.0247061. PMID: 33600487; PMCID: PMC7891757. (Year: 2021).*

(Continued)

*Primary Examiner* — Michael Robert Cammarata
(74) *Attorney, Agent, or Firm* — Sulter Swantz IP

(57) ABSTRACT

An aircraft-based pilot safety system (PSS) includes cameras or other gaze sensors fixed at an aircraft pilot and configured to capture an image stream focused on the pilot's eyes. The gaze sensors continually assess the gaze direction of the pilot (e.g., toward a display, instrument panel, and/or indicator within the cockpit that the pilot is currently looking at or focusing on) and thereby can establish when the pilot is executing a scan pattern and if that scan pattern is nominal for the current flight context by comparing the scan pattern to context-specific reference scan patterns. If, for example, the pilot's gaze deviates from where it should be (e.g., as (Continued)

determined by the current flight segment) or the current scan pattern is interrupted, the system may prompt the pilot to redirect their gaze or resume the scan pattern.

16 Claims, 6 Drawing Sheets

(51) Int. Cl.
*G06T 7/70* (2017.01)
*G06V 40/18* (2022.01)
*G08G 5/00* (2006.01)

(52) U.S. Cl.
CPC .......... *G08G 5/0021* (2013.01); *G08G 5/003* (2013.01); *G06T 2207/30201* (2013.01)

(56) References Cited

U.S. PATENT DOCUMENTS

| | | | | |
|---|---|---|---|---|
| 8,384,534 | B2* | 2/2013 | James | B60W 50/14 |
| | | | | 342/107 |
| 8,915,738 | B2* | 12/2014 | Mannino | G09B 9/052 |
| | | | | 434/236 |
| 9,227,736 | B2* | 1/2016 | Whitlow | G08G 5/0052 |
| 9,533,772 | B2 | 1/2017 | Davalos et al. | |
| 9,904,362 | B2* | 2/2018 | Goldman-Shenhar | |
| | | | | G06F 3/005 |
| 10,102,773 | B2* | 10/2018 | Towers | G09B 19/14 |
| 10,346,697 | B2* | 7/2019 | Adibi | B60W 30/146 |
| 10,426,393 | B2* | 10/2019 | Bosworth | B64D 45/0051 |
| 10,543,854 | B2* | 1/2020 | Wiebel-Herboth | |
| | | | | B60W 30/0953 |
| 10,810,774 | B2 | 10/2020 | Lee et al. | |
| 10,849,543 | B2* | 12/2020 | Paudel | A61B 5/7267 |
| 10,883,851 | B2* | 1/2021 | Feyereisen | G01C 23/00 |
| 11,392,131 | B2* | 7/2022 | Satzoda | B60W 40/08 |
| 2010/0033333 | A1* | 2/2010 | Victor | A61B 5/7264 |
| | | | | 340/576 |
| 2010/0214411 | A1* | 8/2010 | Weinmann | B64D 45/00 |
| | | | | 348/148 |
| 2011/0169625 | A1* | 7/2011 | James | B60W 30/095 |
| | | | | 340/439 |
| 2012/0075123 | A1* | 3/2012 | Keinrath | G08G 5/0021 |
| | | | | 340/963 |
| 2014/0343762 | A1* | 11/2014 | Buratto | B64D 43/00 |
| | | | | 701/14 |
| 2015/0251771 | A1* | 9/2015 | Whitlow | G08G 5/0021 |
| | | | | 701/3 |
| 2016/0027336 | A1* | 1/2016 | Towers | G09B 9/10 |
| | | | | 434/220 |
| 2016/0117947 | A1* | 4/2016 | Misu | B60W 50/085 |
| | | | | 434/62 |
| 2018/0254022 | A1* | 9/2018 | Shahal | G06F 3/1423 |
| 2018/0281985 | A1* | 10/2018 | Moravek | G06F 3/147 |
| 2019/0187790 | A1 | 6/2019 | Woo et al. | |
| 2019/0235496 | A1* | 8/2019 | Dehais | G01C 23/00 |
| 2021/0086910 | A1* | 3/2021 | Perry | B64D 47/02 |
| 2023/0043771 | A1* | 2/2023 | Wu | B64D 43/00 |
| 2023/0215281 | A1* | 7/2023 | Sahoo | G08G 5/0013 |
| | | | | 701/3 |

OTHER PUBLICATIONS

Hebbar, Archana, Abhay Pashilkar, and Pradipta Biswas. "Using Eye Tracker to Evaluate Cockpit Design—A Flight Simulation Study." arXiv preprint arXiv:2106.07408 (2021). (Year: 2021).*
T. Nguyen, C. P. Lim, N. D. Nguyen, L. Gordon-Brown and S. Nahavandi, "A Review of Situation Awareness Assessment Approaches in Aviation Environments," in IEEE Systems Journal, vol. 13, No. 3, pp. 3590-3603, Sep. 2019, doi: 10.1109/JSYST.2019.2918283. (Year: 2019).*
I. Škvareková, V. Aaltovič, P. Pecho and B. Kandera, "Eye Track Technology in Process of Pilot Training Optimization," 2020 New Trends in Aviation Development (NTAD), Starý Smokovec, Slovakia, 2020, pp. 206-210, doi: 10.1109/NTAD51447.2020.9379071. (Year: 2020).*
Vlačić S, Knežević A, Rođenkov S, Mandal S, Vitsas PA. Improving the pilot selection process by using eye-tracking tools. J Eye Mov Res. Feb. 18, 2020;12(3): 10.16910/jemr. 12.3.4. doi: 10.16910/jemr. 12.3.4. PMID: 33828733; PMCID: PMC7880137. (Year: 2020).*
Babu MD, JeevithaShree DV, Prabhakar G, Saluja KPS, Pashilkar A, Biswas P. Estimating Pilots' Cognitive Load From Ocular Parameters Through Simulation and In-Flight Studies. J Eye Mov Res. Sep. 2, 2019;12(3): 10.16910/jemr. 12.3.3. doi: 10.16910/jemr .12.3.3. PMID: 33828735; PMCID: PMC7880144. (Year: 2019).*
Gomolka Z, Kordos D, Zeslawska E. The Application of Flexible Areas of Interest to Pilot Mobile Eye Tracking. Sensors (Basel). Feb. 12, 2020;20(4):986. doi: 10.3390/s20040986. PMID: 32059455; PMCID: PMC7071422 (Year: 2020).*
Brams S, Hooge ITC, Ziv G, Dauwe S, Evens K, De Wolf T, Levin O, Wagemans J, Helsen WF. Does effective gaze behavior lead to enhanced performance in a complex error-detection cockpit task? PLoS One. Nov. 21, 2018;13(11):e0207439. doi: 10.1371/journal. pone.0207439. PMID: 30462695; PMCID: PMC6248957. (Year: 2018).*
Dubois, E., Bla"ttler, C., Camachon, C., & Hurter, C. (Jun. 2017). Eye movements data processing for ab initio military pilot training. In International Conference on Intelligent Decision Technologies (pp. 125-135). Springer, Cham. (Year: 2017).*
Diaz JM, Bil C, Dyer AG, Garcia JE. Visual scan patterns of expert and cadet pilots in VFR landing. 17th AIAA Aviat Technol Integr Oper Conf 2017. 2017;(June). (Year: 2017).*
C. Thomay, B. Gollan, A. Ferscha and M. Spiess, "Taking Off: Towards Real Competence-Based Flight Pilot Training," 2019 17th International Conference on Emerging eLearning Technologies and Applications (ICETA), Starý Smokovec, Slovakia, 2019, pp. 764-769, doi: 10.1109/ICETA48886.2019.9040147. (Year: 2019).*
Extended Search Report in European Application No. 22177246.0 dated Oct. 12, 2022.

* cited by examiner

PILOT SAFETY SYSTEM WITH CONTEXT-SENSITIVE SCAN PATTERN MONITORING AND ALERTING

RELATED APPLICATIONS

U.S. Provisional Patent Application Ser. No. 63/196,923 filed Jun. 4, 2021 and entitled PILOT SAFETY SYSTEM WITH CONTEXT-SENSITIVE GAZE MONITORING AND ALERTING.

Said U.S. Provisional Patent Application Ser. No. 63/196,923 is herein incorporated by reference in its entirety.

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

BACKGROUND

Aircraft pilots, whether in a commercial, civil, or military context, must rapidly and simultaneously process large amounts of visual intelligence in order to safely guide an aircraft through the various stages or phases of a successful and safe flight. While technological advances, e.g., heads-up displays (HUD) both increase a pilot's access to important visual intelligence and increase the precision of said visual intelligence, pilots are still susceptible to poor situational awareness (SA), which may in turn lead to pilot error. Skilled pilots maintain situational awareness via frequent visual scans, both within the control area and outside the aircraft, for dynamic updates of the current state of the aircraft with respect to navigation, operations, proximate traffic, and so forth. Even so, pilots may still lose focus inflight. For example, during times of high workload a pilot may become too focused on a particular display or instrument, while not paying sufficient (or any) attention to indicators or alerts elsewhere in the cockpit. Similarly, in times of low workload the pilot may become distracted by something inside or outside the cockpit. Such lapses in situational awareness can result in missed alerts and even potentially catastrophic situations. Further, what constitutes vital visual intelligence may evolve over the course of a flight plan, as the aircraft completes initial startup checks, takes off, executes inflight operations and/or mission objectives, approaches its destination, and lands.

SUMMARY

In a first aspect, an aircraft-based pilot safety system (PSS) is disclosed. In embodiments, the PSS includes gaze sensors for capturing an image stream of one or both eyes of a pilot (or co-pilot) of the aircraft, where the pilot is seated within the cockpit or control area of the aircraft (e.g., in a pilot or co-pilot seat). The PSS includes a memory for storing reference scan patterns, e.g., patterns via which the pilot gains or refreshes visual intelligence of cockpit displays and indicators as well as the vicinity of the aircraft via cockpit windows. The PSS includes one or more processors for analyzing the image stream of the pilot's eyes and determining a gaze direction, e.g., what the pilot's eyes are currently looking at or fixated upon. The PSS maps the gaze direction to a gaze target, e.g., the specific cockpit display, indicator, or window at which the pilot is looking. Based on a sequence of gaze targets, the PSS identifies a scan pattern being executed by the pilot, and determines whether the scan pattern is nominal or off-nominal by comparing the current scan pattern to the reference scan patterns. Off-nominal scan patterns may include scan patterns that are interrupted or deviated from, e.g., by pilot fixation on a particular gaze target, or the absence of a regular scan pattern. If a scan pattern is determined to be off-nominal the OSS prompts the pilot to redirect their attention.

In some embodiments, gaze targets include cockpit displays, cockpit instrument panels or instruments, cockpit indicators, aircraft subsystems, or cockpit windows.

In some embodiments, a reference scan pattern is based on a sequence of two or more reference gaze targets.

In some embodiments, the PSS is in communication with a flight management system (FMS) or other flight control system which provides the PSS with flight context identifying a current flight segment, e.g., takeoff, climb, cruise, descent, approach, landing. The PSS assesses a current scan pattern as nominal or off-nominal based on whether the scan pattern is similar to a reference scan pattern appropriate for the current flight context.

In some embodiments, the PSS determines whether a current scan pattern is nominal or off-nominal based on whether the PSS subject (e.g., a pilot or co-pilot) is seated in a (left-side) pilot seat or a (right-side) co-pilot seat.

In some embodiments, the PSS subject is a pilot-in-command (PIC) or a co-pilot, and the PSS determines whether a current scan pattern is nominal or off-nominal based on role-specific reference scan patterns (e.g., specific to the PIC or co-pilot).

In some embodiments, the gaze direction is determined based on a position and orientation of the pilot's eye/s.

In some embodiments, the PSS maps a gaze direction to a gaze target based on a relative position and orientation of the gaze target, e.g., relative to the position and orientation of the pilot's eyes.

In some embodiments, the PSS identifies a current scan pattern as off-nominal based on a fixation by the pilot on a particular gaze target for at least a threshold duration.

In some embodiments, the PSS identifies a current scan pattern as off-nominal if a current nominal scan pattern is deviated from or interrupted.

In some embodiments, the PSS prompts the pilot to redirect via a visual or auditory warning.

In a further aspect, a method for context-sensitive scan pattern monitoring is also disclosed. In embodiments, the method includes storing to a memory of an aircraft-based pilot safety system (PSS) reference scan patterns for an aircraft pilot (or co-pilot), each reference scan pattern based on a sequence of two or more targets of the pilot's gaze. The method includes capturing, via gaze sensors within the aircraft cockpit, an image stream of the pilot's eye or eyes when the pilot is seated within the cockpit (e.g., in the pilot seat). The method includes determining, via the PSS, a gaze direction of the pilot's eyes (e.g., what the pilot is looking at) based on the image stream. The method includes mapping, via the PSS, the gaze direction to specific gaze targets within the cockpit. The method includes determining, via the PSS, a current scan pattern executed by the pilot based on sequential mapped gaze targets. The method includes determining, via the PSS, whether a current scan pattern is nominal or off-nominal via comparison to appropriate reference scan patterns. The method includes, when a current scan pattern is determined to be off-nominal, prompting the pilot, via the PSS, to redirect their attention.

In some embodiments, the method includes receiving flight context information from a flight management system (FMS) or other flight control system, the flight context information indicative of a current flight segment, and determining whether a current scan pattern is nominal or off-nominal based on reference scan patterns appropriate to the current flight segment or flight context.

In some embodiments, the method includes determining whether a current scan pattern is nominal or off-nominal based on reference scan patterns appropriate to whether the PSS subject is seated in a (left-side) pilot seat or a (right-side) co-pilot seat.

In some embodiments, the method includes determining whether a current scan pattern is nominal or off-nominal based on reference scan patterns appropriate to whether the PSS subject is serving as a pilot-in-command (PIC) or as a co-pilot.

In some embodiments, the method includes mapping determined gaze directions to specific gaze targets based on the relative positions and orientations of cockpit-based gaze targets (e.g., displays, indicators, instruments, windows) relative to the position and orientation of the pilot's eyes.

In some embodiments, the method includes determining a current scan pattern is off-nominal based on a focus by the pilot on a single gaze target for at least a threshold duration.

In some embodiments, the method includes determining a current scan pattern is off-nominal if a nominal scan pattern is determined to be interrupted or deviated from.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
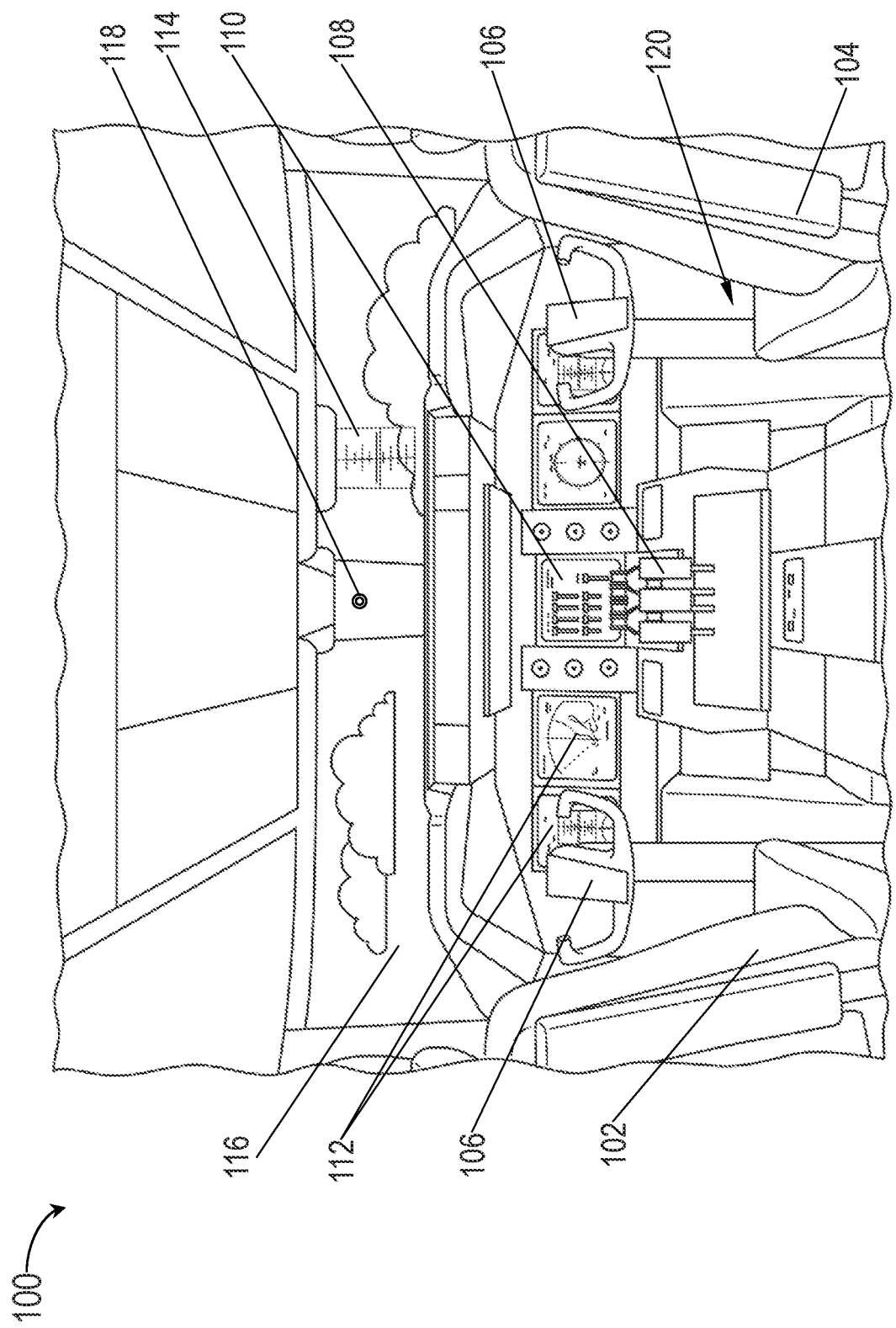
FIG. 1 is an illustration of an aircraft cockpit incorporating a pilot safety system (PSS) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for context-sensitive gaze monitoring to track, identify, and/or assess scan patterns executed by a pilot or co-pilot by determining precisely on which cockpit components the pilot is focusing their gaze and/or attention from moment to moment. From the moment an aircraft begins to taxi forward until it comes to a stop at its destination, the pilot/s must make efficient use of multiple senses to address potential collision threats (e.g., traffic, objects, obstacles) throughout all flight segments. In addition, the pilot must monitor multiple aircraft displays, alerts, indicators and/or subsystems to maintain flight operations and preserve the safety of the aircraft, its crew and passengers, and its payload.

In embodiments, an aircraft-based pilot safety system (PSS) may include a context-sensitive pilot gaze tracking system for monitoring the pilot's focus by attempting to determine in which direction the pilot is looking. In some embodiments, the system may infer from a given gaze direction what the pilot is currently looking at (e.g., mapping the gaze direction to a specific gaze target), or correlate multiple assessments to map a sequence of gaze targets to a scan pattern. If the pilot's attention is determined to be fixed on the wrong visual element or elements given the context, the system may prompt the pilot to redirect their attention. By continually determining where the pilot's gaze is aimed, the system can identify when the pilot is conducting a scan pattern. Further, the system may determine whether the scan pattern is nominal in flight context, e.g., based on the current flight segment, or whether a scan pattern is off-nominal in some way. If, for example, the scan pattern is inappropriate for the current flight context, or the pilot fails to perform a context-appropriate scan pattern, or if a current scan pattern is interrupted or aborted, the system may alert the pilot to redirect or refocus their attention.

Referring to FIG. 1, a control space of an aircraft 100 is disclosed.

The control space may include a pilot seat 102, co-pilot seat 104, control sticks 106, throttle controls 108, communications controls 110, flight displays 112, heads-up display 114 (HUD), windows 116, and gaze sensor 118.

In embodiments, the control space may include a cockpit of the aircraft 100 or any like space set aside for control of a vehicle or mobile platform by one or more operators (not shown; e.g., a pilot, co-pilot, and/or other crewmember) occupying a dedicated control position (e.g., the pilot seat 102 or co-pilot seat 104). For example, the operator may occupy either the pilot seat or co-pilot seat 104 and, throughout the totality of a flight sequence (e.g., through taxi, takeoff, climb, cruise, descent, landing, and taxi segments of a commercial aircraft) directly maneuver (or otherwise exercise primary control over) the aircraft 100, e.g., via the control stick 106, throttle controls 108, or other physical controls located in the control space and configured for engagement by the operator. In embodiments, the operator may serve as pilot-in-command (PIC), directly and ultimately responsible for aircraft operations and for the safety of the aircraft, its cargo, its crew, and/or its passengers. For example, the PIC may be seated in the pilot seat 102 and a co-pilot or first officer in the co-pilot seat 104, the PIC delegating operational responsibilities to the co-pilot or first officer. Additionally or alternatively, the PIC may be seated in the co-pilot seat 104.

Similarly, the operator may maintain situational awareness throughout the flight sequence based on visual intelligence. In embodiments, the operator may gain awareness as to the current status of the aircraft 100 by viewing the flight displays 112 and/or the HUD 114. In embodiments, some or all of the flight displays 112 or HUD 114 may be interactive touchscreens allowing the operator to engage with a touch-sensitive display surface and either adjust the information being displayed or exercise control over the aircraft (or one or more components or subsystems thereof).

In embodiments, the flight displays 112 may be implemented using any of a variety of display technologies, including CRT, LCD, organic LED, dot matrix display, and others. The flight displays 112 may be configured to display various types of flight-related and/or mission-related information, including, but not limited to, navigational information, operational information associated with one or more aircraft systems or subsystems, communications information, or mission status information.

Further, in embodiments the operator may enhance situational awareness by looking through the windows 116 (e.g., forward windows, side windows). For example, the operator may use the windows 116 to enhance situational awareness by establishing positive visual identification of underlying terrain and natural or astronomical features (e.g., the position of the sun, moon, or stars), manmade landmarks (e.g., airport facilities, manmade obstacles), proximate air traffic (e.g., manned aircraft reporting a position, unmanned aircraft not otherwise reporting a position), and/or mission-specific targets (e.g., ground-based, water-based, airborne).

In embodiments, throughout the flight sequence, from initial to final taxiing, the operator may engage with the control space of the aircraft 100 according to detectable routines or patterns. For example, the operator may be positioned in the pilot seat 102, physically engaging with the control stick 106 and throttle controls 108 via motion of the hand, arm, and/or torso. Similarly, the operator may, from their position in the pilot seat 102, visually engage with focus targets, e.g., physical controls, flight displays 112, HUD 114, and windows 116 by directing their gaze in the direction of each focus target in order to focus their vision and attention thereon.

In embodiments, the operator may additionally engage with electronic flight bags (EFB) or other like mobile devices not physically incorporated into the control space but introduced therein by the operator and connected (e.g., via physical or wireless link) to the flight control system. For example, the operator occupying the pilot seat 102 may provide a tablet or like mobile communications device configured for displaying additional visual intelligence. In embodiments, the mobile device may occupy additional space (120) not already occupied by physical controls, windows 116, or display surfaces (112, 114). For example, the tablet may be attached to the operator's knee (e.g., via a kneeboard), carried in the operator's lap, mounted on a center console, or otherwise occupying a space 120 low in the operator's field of view (relative to the operator).

In embodiments, the flight displays 112 may further be configured to display operational context of various types and formats. For example, an airborne aircraft (e.g., a target) may be detected. The airborne aircraft (e.g., or indicator/s thereof) may be displayed on the flight displays 112. In response to the displayed operational context, the aircraft operator may gaze toward the flight displays 112 (e.g., toward specific portions thereof). In embodiments, the gaze sensor 118 may capture an image stream of the eye/s of the operator visually engaging with the flight displays 112 and/or other control interfaces throughout the control space of the aircraft 100.

In embodiments, the gaze sensor 118 may include any suitable visual sensor, such as, but not limited to, a camera-based gaze sensor capturing a video stream of one or both eyes of the operator. The captured video stream may then be provided to a controller for analysis as described below. For example, a single gaze sensor 118 or bank of gaze sensors may be centrally mounted, such that gaze sensors monitor the pilot seat 102 and/or the co-pilot seat 104 from a different position relative to each seat. Alternatively, gaze sensors 118 dedicated to the pilot seat 102 and co-pilot seat 104 may be mounted in different positions within the control space of the aircraft 100, such that each gaze sensor is optimally positioned with respect to the respective occupant of each seat.

Figure 2:
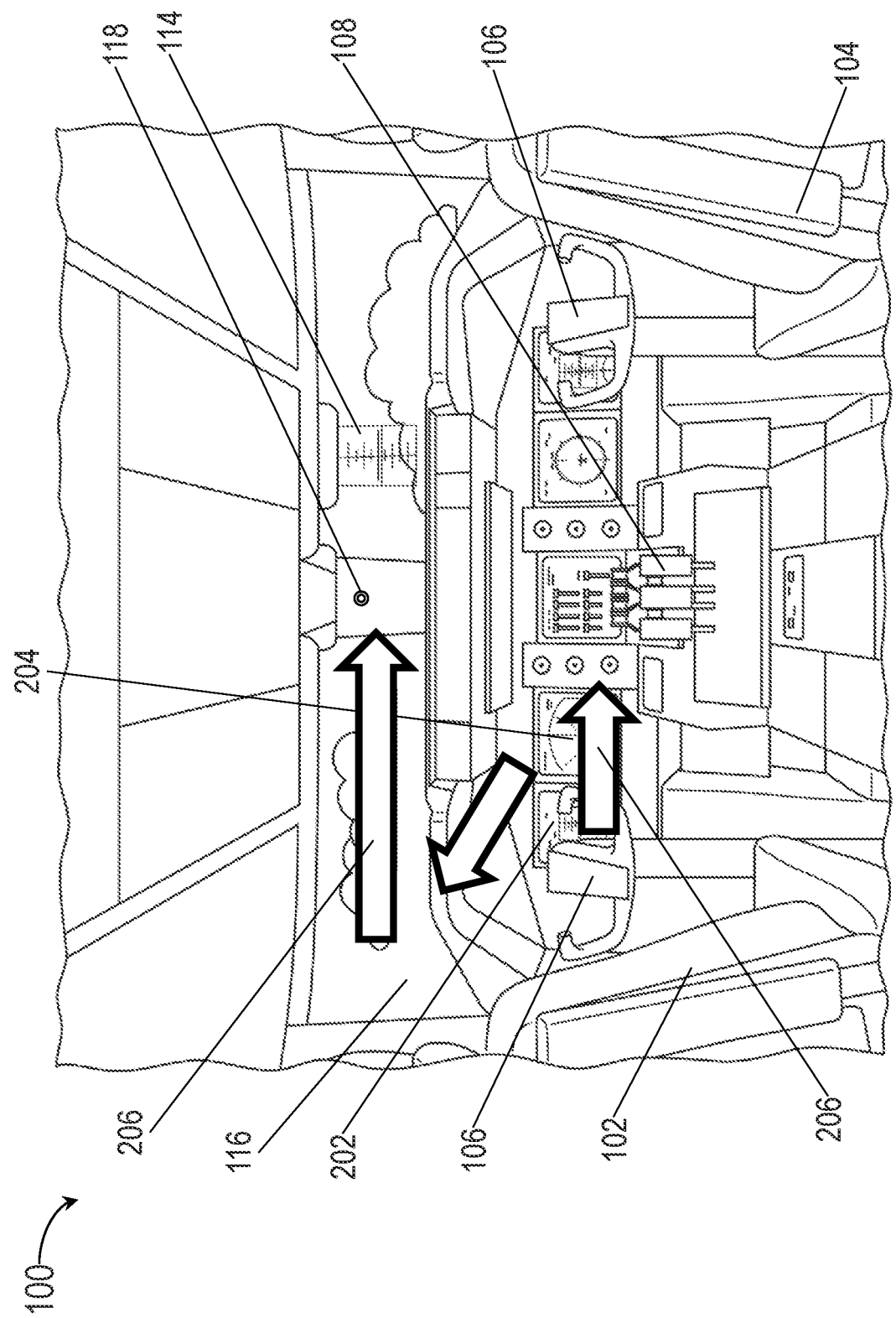
FIG. 2 is an illustration of an aircraft cockpit showing scan patterns detectable by the PSS of FIG. 1.

Referring now to FIG. 2, the control space of the aircraft 100 is shown.

In embodiments, the aircraft 100, whether it is a civil, commercial, or military aircraft, may execute a flight plan associated with a flight from an origin point to a destination point. For example, the flight plan may comprise a sequence of one or more distinct flight segments, e.g., pre-departure taxi, takeoff, initial climb, cruise, mission-specific inflight operations, initial descent, final approach, landing, post-landing taxi. Each individual flight segment may be associated with a particular flight context distinct to that flight segment. For example, takeoff, climb, descent, and landing segments may be associated with multiple adjustments to aircraft throttle and control surface settings (and references to indicators thereof); approach segments may add constant maintenance of navigational status, e.g., to execute an approach pattern or maintain a holding pattern. Cruise segments, however, may be associated with periodic navigational and communications checks and less direct control of aircraft subsystems, as the aircraft 100 may do little more than continue on a relatively straight course while maintaining adequate separation from any proximate aircraft.

In embodiments, the operator may continually update their visual intelligence as to the state of the aircraft 100 via periodic execution of scan patterns. Pilots can develop best practices by following scan patterns until they become a habitual part of maintaining situational awareness. For example, a scan pattern may include a sweep of the pilot's external viewing area through the window 116 (e.g., in order to make visual contact with traffic, obstacles, and/or landmarks) and references to instruments (e.g., control sticks 106, throttle controls 108) and/or displays (e.g., primary flight display 202 (PFD), navigational display 204, HUD 114) within the control space.

In embodiments, each flight segment executed by a given aircraft 100 may be associated with a set of reference scan patterns optimal to that flight segment. For example, a given reference scan pattern may be indicated for more than one flight segment, e.g., if the reference scan pattern provides for a selection of visual intelligence useful in the context of that flight segment. During cruise segments, a reference scan pattern 206 may include a reference to the PFD 202, to the navigational display 204, and then a horizontal scan across the window 116 to visually identify proximate air traffic or verify position with reference to terrain or landmarks. Approach and landing segments may involve more frequent references to the window 116 due to the need for extra vigilance in identifying proximate aircraft clustering in the vicinity of airports and runways, and to instrument panels to monitor throttle levels and/or control surface settings, minimizing "head-down" operations.

In embodiments, the precise pattern or sequence via which the pilot accomplishes a reference scan pattern 206 may vary somewhat from pilot to pilot. For example, a scan pattern may incorporate references to the PFD 202, the navigational display 204, and the window 116 in any order and may still align with a reference scan pattern 206 provided the pilot focuses on the necessary elements. However, from time to time the pilot may become distracted or may lose focus. For example, during cruise segments the pilot may become bored or fatigued, "zoning out" and neglecting periodic scan patterns (or omitting component elements of a scan pattern). Obviously, such activity may result in poor situational awareness on the part of the pilot. Additionally, however, degraded scan patterns may clearly indicate fatigue on the part of the pilot which may lead to other pilot error unrelated to visual intelligence. Accordingly, monitoring a pilot's scan patterns, or neglect thereof, may provide an additional indicator of pilot well-being or ability to maintain operational control.

Figure 3A:
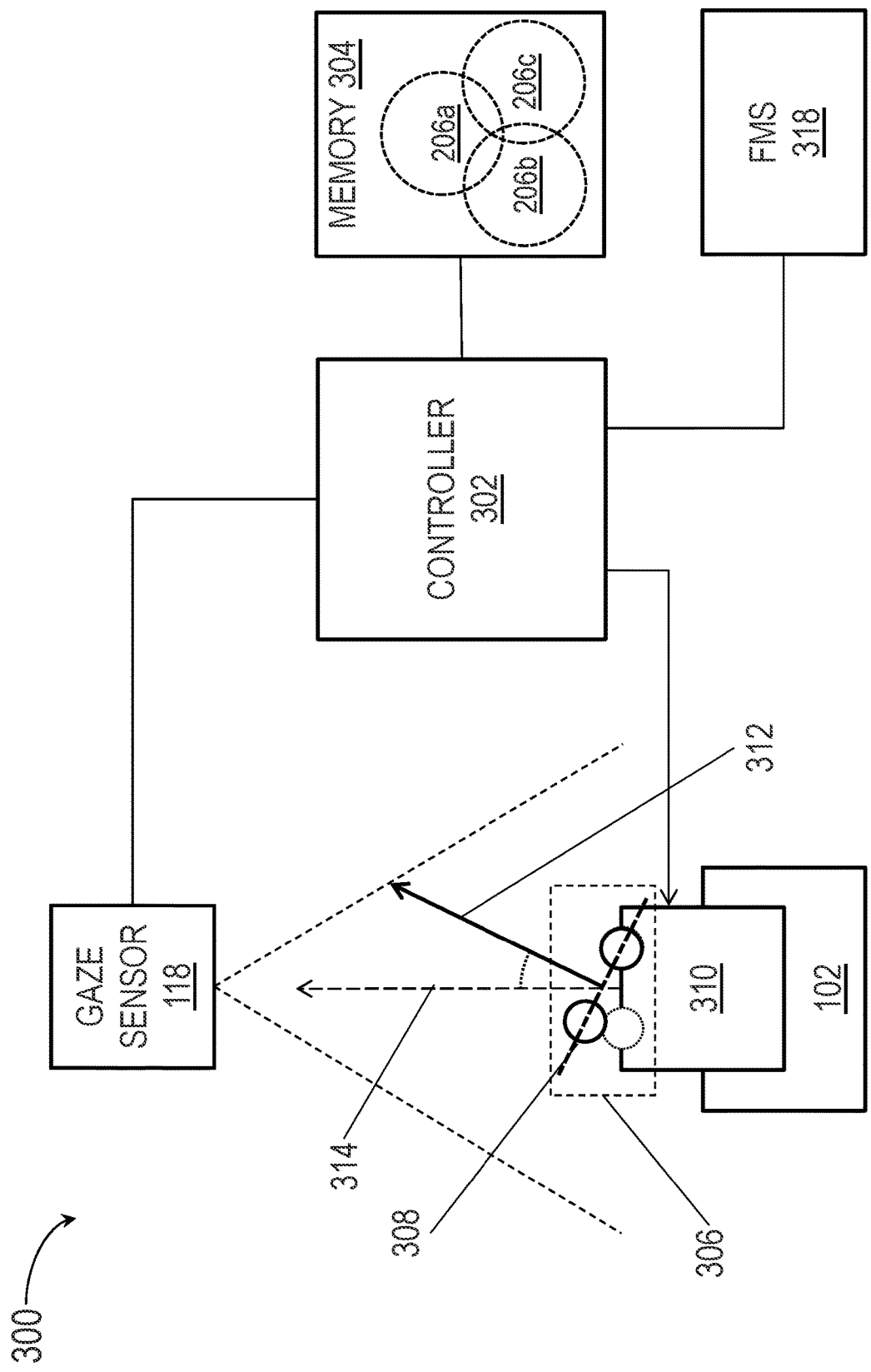
FIG. 3A is a block diagram illustrating the PSS of FIG. 1.

Referring to FIG. 3A, a pilot safety system 300 (PSS) of the aircraft 100 is shown. The PSS 300 may include gaze sensors 118, controller 302, and memory 304.

Figure 3B:
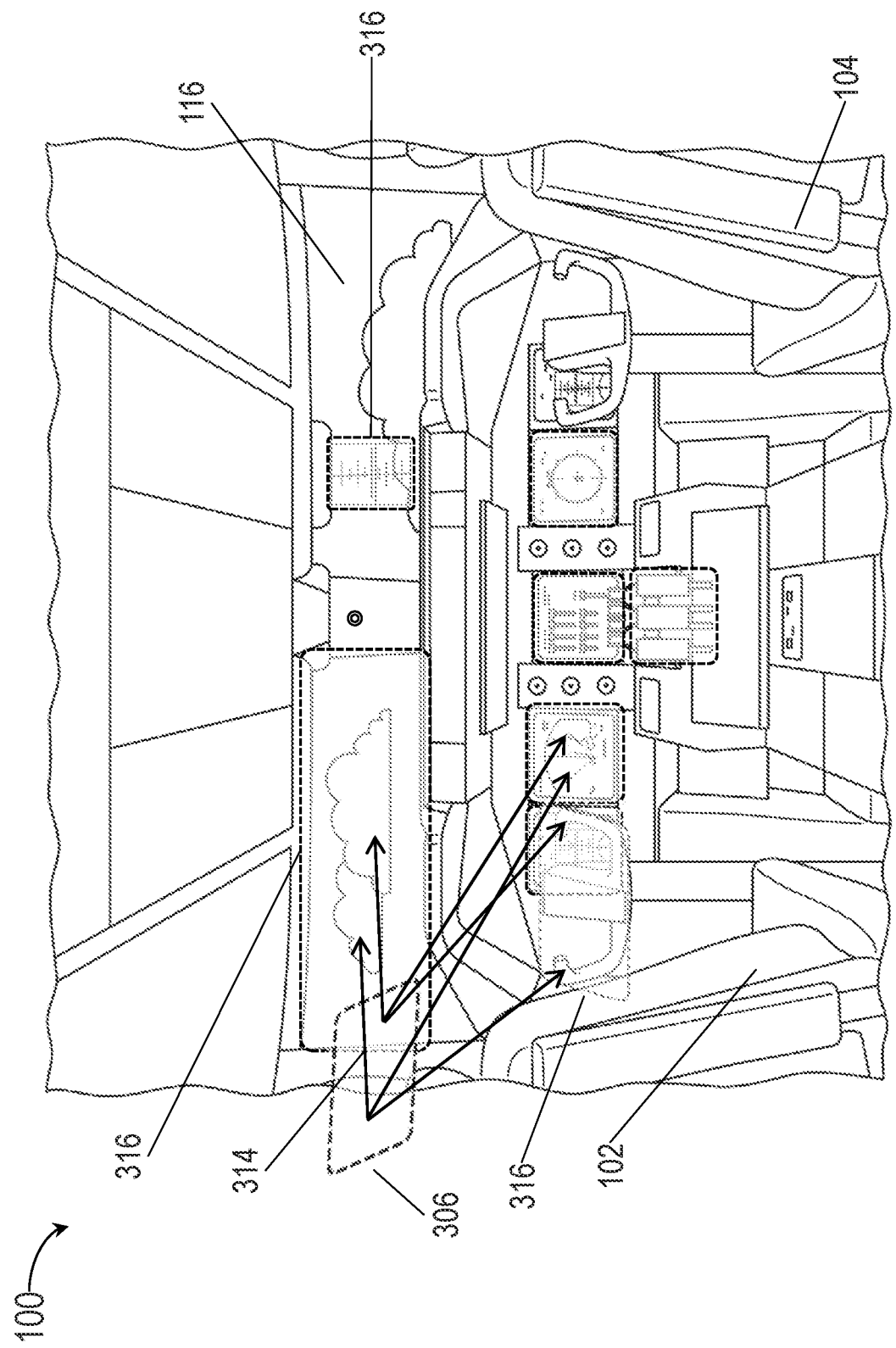
FIG. 3B is an illustration of an aircraft cockpit showing gaze direction mapping by the PSS of FIG. 1.

In embodiments, the gaze sensors 118 may be optimally positioned within the control space of the aircraft (100, FIG. 3B), e.g., aimed directly at a space 306 directly ahead of the pilot seat 102 and corresponding to the likely location of the head and eyes 308 of the pilot 310 when seated in the pilot seat. For example, the orientation of the gaze sensors 118 may be calibrated for each pilot 310, e.g., based on vital statistics, such that the gaze sensors 118 are optimally positioned and oriented with respect to the space 306.

In embodiments, the gaze sensors 118 may include cameras or other image sensors configured to capture a continuous image stream portraying the eyes 308 of the pilot 310 throughout the full sequence of flight segments, e.g., from initial departure from the gate/initial taxi to final taxi once the aircraft 100 has landed at its destination. For example, the captured image stream may be forwarded to the controller 302 for analysis and processing. In embodiments, the controller 302 may include one or more control processors configured for eye tracking analysis of the captured image stream, e.g., to determine a position and orientation 312 of the eyes 308 in real time or near real time. For example, the position of the eyes 308 may remain relatively consistent within the space 306 throughout the flight. However, the orientation 312 of the eyes 308 may shift frequently as the pilot 310 checks and monitors cockpit components, looks outside the window (116, FIG. 3B) to observe external targets, and conducts scan patterns to maintain situational awareness. For example, the position and orientation 312 of the eyes 308 may be calibrated via a default position and orientation (314), e.g., wherein the pilot 310 is looking straight ahead at eye level. In embodiments, the controller 302 may continually assess the position and orientation 312 of the eyes 308 (e.g., the gaze direction) relative to this default position and orientation 314, e.g., in terms of an azimuthal angle and elevational angle relative to the default position and orientation.

In embodiments, the controller 302 may be in communication with a memory 304 or other like data storage. For example, the memory 304 may store position information of every significant cockpit component to which the pilot 310 may refer inflight (e.g., control sticks 106, throttle controls 108, communications controls 110, flight displays 112, heads-up display 114 (HUD), windows 116). Accordingly, referring also to FIG. 3B, the memory 304 may store, or the controller 302 may determine, a relative position and/or orientation 316 of each cockpit component relative to the space 306.

In embodiments, based on the determined position and orientation 312 of the eyes 308 of the pilot 310 and the relative positions and/or orientations 316 of each cockpit component, the controller 302 may determine a gaze target for each gaze direction by mapping each determined gaze direction to a cockpit component, e.g., determining what the pilot 310 is currently looking at or focusing on. For example, the controller 302 may account for other factors (e.g., pupil dilation, pupil dilation, saccadic movements and duration) to assess to a threshold level of confidence that the pilot 310 is looking at, and paying attention to, a particular gaze target. In embodiments, via continual monitoring of the current gaze target in context with prior gaze targets (and, e.g., the duration of each gaze target), the controller 302 may determine whether or not the pilot 310 is currently conducting a scan pattern.

In embodiments, the memory 304 may further be configured for storage of context-sensitive reference scan patterns (206, FIG. 2), such that the controller 302 may evaluate a current scan pattern in context by comparing the current scan pattern to reference scan patterns 206 stored to memory 304. For example, depending upon the current scan pattern and various applicable flight contexts, the controller 302 may determine, e.g.:

Does the current scan pattern match a reference scan pattern 206?

If the current scan pattern matches a reference scan pattern, is the current scan pattern nominal or off-nominal based on the current flight context?

If the current scan pattern is a nominal match for a reference scan pattern, does the pilot 310 complete the nominal scan pattern?

Based on the current flight context, should the pilot 310 be performing a particular reference scan pattern but is not doing so?

In embodiments, the memory 304 may organize reference scan patterns 206 according to a variety of applicable flight contexts. For example, context-specific reference scan patterns stored by the memory 304 may include, but are not limited to: flight context-specific reference scan patterns 206a; seat-specific reference scan patterns 206b; and/or role-specific reference scan patterns 206c. In embodiments, a particular reference scan pattern 206 may be applicable across more than one context.

In embodiments, flight context-specific reference scan patterns 206a may organize reference scan patterns according to a particular flight segment and/or other flight conditions. If, for example, the aircraft 100 is currently on final approach to a landing, the current scan pattern may be compared to reference scan patterns 206a associated with final approach stages to determine whether the current scan pattern is nominal in context. In embodiments, the PSS 300 may be in communication with a flight management system 318 (FMS) or flight control system (FCS) configured to provide the controller 302 with flight context information either informing the controller of the current flight segment (e.g., per the flight plan) or providing flight context information from which the controller may determine the current flight segment. For example, the FMS 318 may update the controller 302 as to the current altitude, position, angle of attack, control surface configuration, etc., of the aircraft 100, from which the controller may infer with sufficient confidence the current flight segment.

In embodiments, if a current scan pattern is determined to be off-nominal, the controller 302 may prompt the pilot 310 (e.g., via visual and/or auditory alert) to redirect their attention. For example, the prompt may be a minimally intrusive auditory or visual alert recognizable to the pilot 310 as a prompt to redirect attention. In some embodiments, the prompt may include a visual component (e.g., via a flight display or other like visual indicator); for example, a flight display may prompt the pilot to look at a particular cockpit component.

Similarly, seat-specific reference scan patterns 206b may allow the controller to determine and evaluate a current scan pattern based on whether the subject is seated in the pilot seat 102 or in the co-pilot seat (104, FIG. 1). For example, the control space of the aircraft 100 may incorporate a single set of cockpit components accessible to both a pilot and co-pilot. However, the positions and orientations of each cockpit component relative to the pilot seat 102 (in particular, to the space 306 corresponding to the likely location of the eyes 308) will differ from positions and orientations relative to the co-pilot seat 104 (e.g., to a like space 306 relative to the co-pilot seat).

Similarly, role-specific reference scan patterns 206c may allow the controller 302 to determine if a particular current scan pattern is nominal or off-nominal in light of whether the subject of the gaze sensors 118 is a pilot, co-pilot, or other member of the flight crew. For example, the aircraft 100 will have a pilot-in-command (PIC) directly responsible for aircraft operations and for the safety of the aircraft 100 (and by extension its crew, its passengers, and its payload). The PIC may be supported by a co-pilot, who may themselves be a qualified pilot, or other crewmembers. If, for example, gaze sensors 118 are configured for tracking a PIC seated in the pilot seat 102 and a co-pilot seated in the co-pilot seat 104, determination of current scan patterns and evaluation of current scan patterns in context may account for different inflight roles and responsibilities between the PIC and co-pilot, and thus different role-specific reference scan patterns 206c applicable to the PIC and co-pilot.

In embodiments, additional context-specific reference scan patterns may be pilot-specific. For example, if the PIC is an experienced pilot, the PSS 300 may be trained (e.g., via machine learning techniques or neural networks) to recognize common scan patterns performed by the experienced pilot as reference scan patterns 206, and to evaluate eye tracking and current scan patterns associated with the experienced pilot in the context of reference scan patterns specific to the experienced pilot. Similarly, if the PIC is a relatively new pilot or a pilot in training, reference scan patterns 206 may be developed to help train the new pilot in adopting habitual scan patterns in alignment with best practices.

Figure 4:
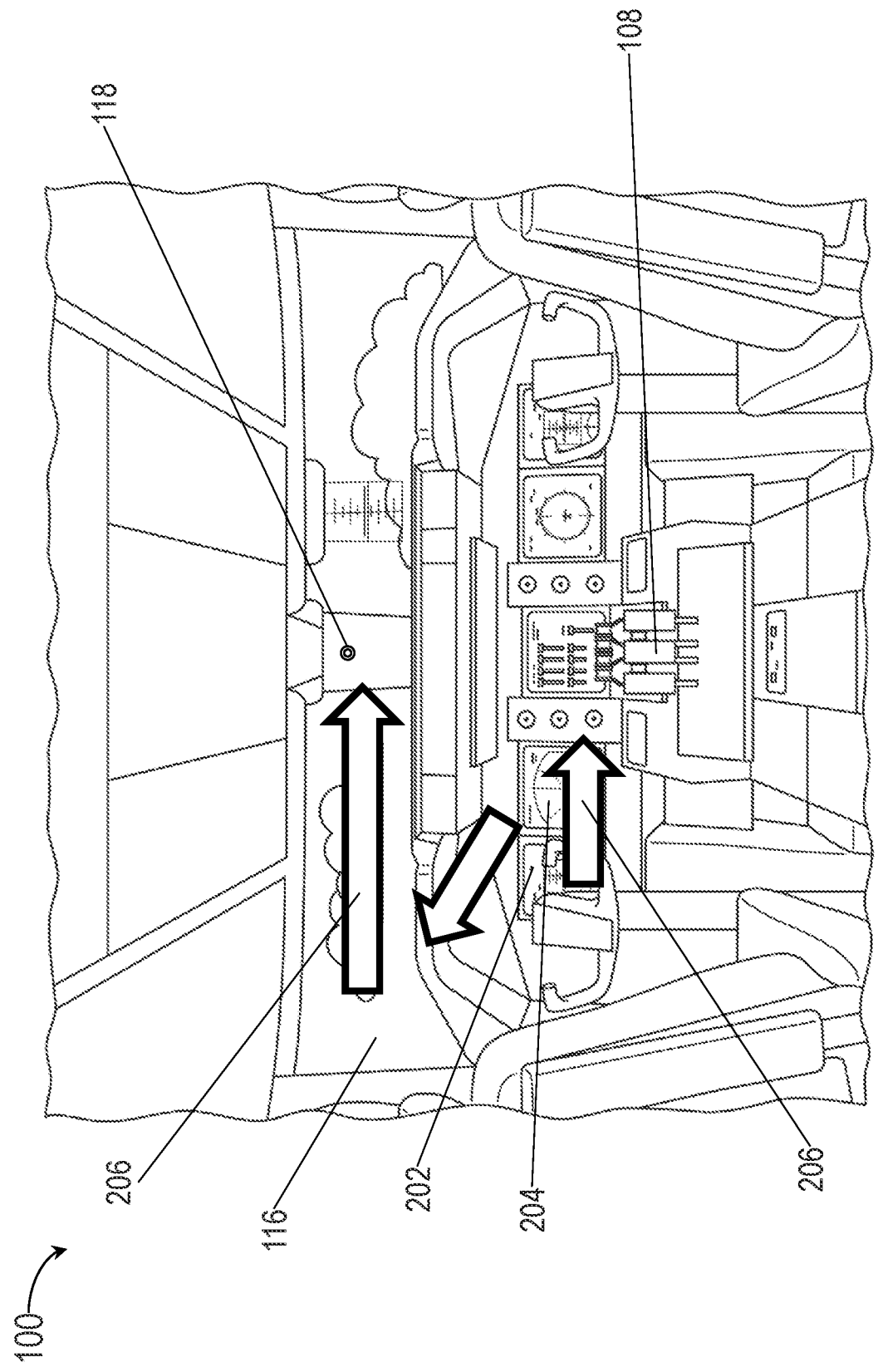
FIG. 4 is an illustration of an aircraft cockpit showing off-nominal scan pattern detection by the PSS of FIG. 1.

Referring to FIG. 4, the control space of the aircraft 100 is shown.

In embodiments, the controller (302, FIG. 3A) may determine 1) if the pilot (310, FIG. 3A) is conducting a current scan pattern based on a sequence of determined gaze targets and 2) if a current scan pattern is established, whether the current scan pattern is nominal or off-nominal in context. For example, if a current scan pattern matches a reference scan pattern (206, FIG. 2; 206a-206c, FIG. 3A) that is appropriate for the current flight context (e.g., the current flight segment, current flight conditions, whether the subject is seated in the pilot seat 102 or co-pilot seat 104, whether the subject is a PIC or a co-pilot), the controller 302 may conclude that the current scan pattern is nominal in context and continue monitoring without taking corrective action.

In embodiments, the controller 302 may determine that a current scan pattern is off-nominal in context. For example, if the controller 302 established that a current scan pattern is in progress, but matches a reference scan pattern 206, 206a-206c that is inappropriate for the current flight context, the controller 302 may determine that the current scan pattern is off-nominal and prompt the pilot 310 to redirect their attention.

In some embodiments, the controller 302 may determine a current scan pattern to be off-nominal if the current scan pattern demonstrates consistency with a context-appropriate reference scan pattern 206, 206a-206c but is then interrupted or deviated from. For example, the pilot 310 may be conducting a scan pattern consistent with level flight at cruising altitude, e.g., checking the PFD 202, then the navigation display 204, then scanning horizontally across the window 116 for landmarks and/or proximate air traffic (e.g., to obtain visual confirmation of targets identified by the navigation display). The pilot 310 may direct their gaze toward the PFD 202 for a nominal amount of time, then shift their gaze to the navigation display 204, then become fixated on the navigation display for an excessive amount of time sufficient to interrupt the scan pattern or indicate fatigue or disorientation on the part of the pilot. For example, if the controller 302 determines that the gaze direction of the pilot 310 is fixed on a particular gaze target (e.g., the navigation display 204) for at least a threshold amount of time (e.g., a threshold number of consecutive frames), the controller may conclude that the current scan pattern has become off-nominal and prompt the pilot to redirect.

Similarly, if a pilot 310 in the course of a nominal current scan pattern should shift their gaze to a gaze target (e.g., the throttle controls 108) not consistent with the current reference scan pattern 206, 206a-206c matching the current scan pattern (and not matching any other context-appropriate reference scan pattern), the controller 302 may conclude that the pilot 310 has deviated from the nominal scan pattern and that the current scan pattern has become off-nominal, prompting the pilot to redirect.

In embodiments, a particular flight context may provide for periodic or frequent execution of reference scan patterns 206, 206a-206c as described above. If, for example, a threshold amount of time passes without a current scan pattern being detected, or a scheduled context-appropriate reference scan pattern 206, 206a-206c is not detected as scheduled or as frequently as the flight context provides, the controller may interpret the absence of a current scan pattern as an off-nominal scan pattern, prompting the pilot to redirect.

Figure 5:
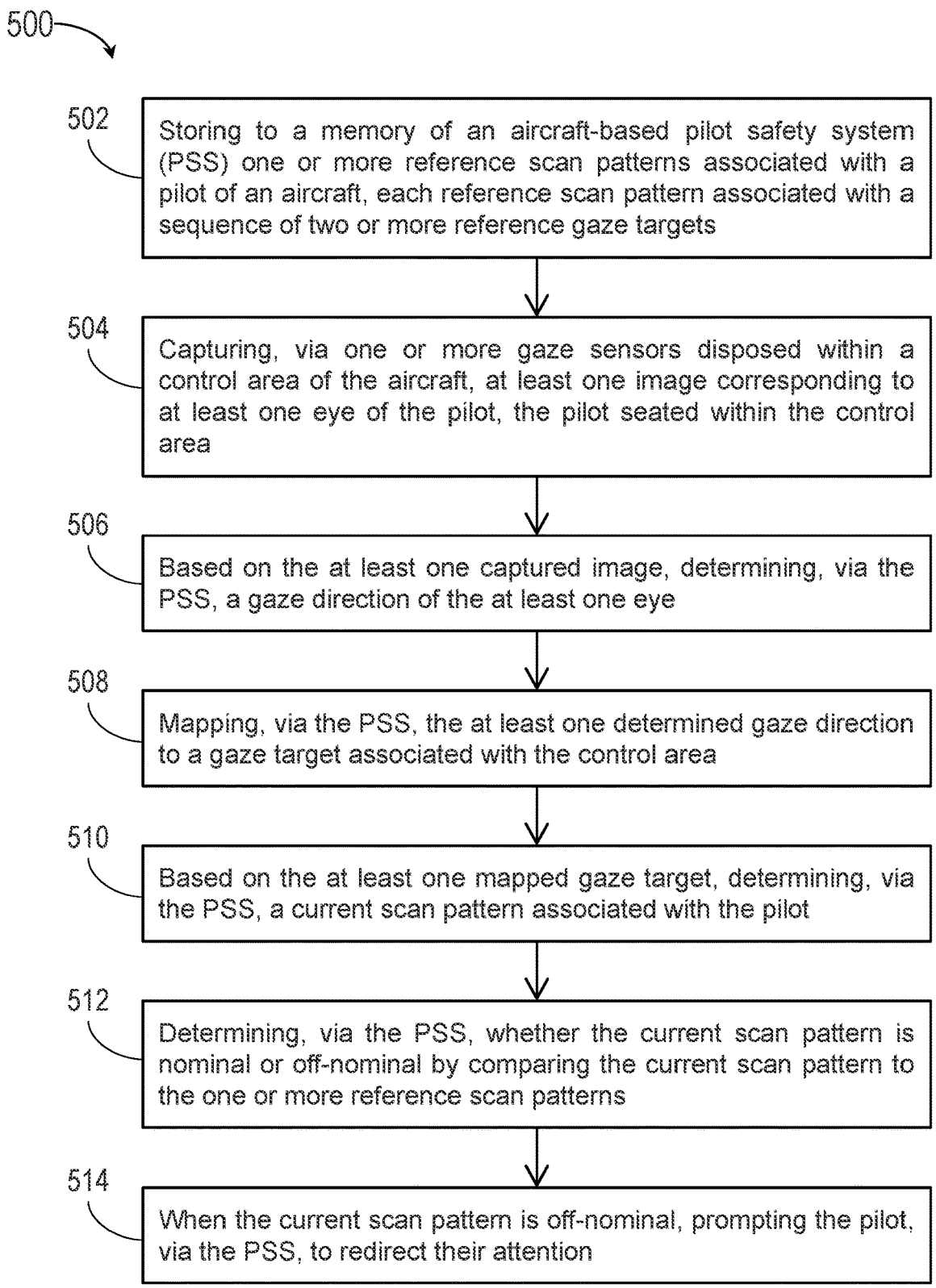
FIG. 5 is a flow diagram illustrating a method for context-sensitive scan pattern monitoring according to example embodiments of this disclosure.

Referring now to FIG. 5, the method 500 may be implemented by the PSS 300 aboard the aircraft 100 and may include the following steps.

At a step 502, a memory of the PSS stores context-sensitive reference scan patterns relevant to a particular flight plan and/or pilot. For example, each reference scan pattern may comprise a sequence of gaze targets (e.g., displays, instrument panels, cockpit controls, cockpit windows) relevant to a particular flight segment, a particular cockpit seat, a particular flight role (e.g., pilot-in-command, co-pilot), and/or a particular pilot.

At a step 504, gaze sensors in the cockpit capture image streams of the eyes of a pilot (or co-pilot) seated in the cockpit, the gaze sensors oriented to the appropriate pilot or co-pilot seat.

At a step 506, the PSS determines, based on the captured images, a gaze direction of the pilot's eyes in real time or near real time. For example, the PSS may determine a position and orientation of the pilot's eyes relative to a default or origin position and orientation.

At a step 508, the PSS determines a target of the pilot's gaze by mapping the gaze direction to a specific cockpit component (e.g., a display, control, instrument panel, window) based on a relative position and orientation of the cockpit component relative to the position and orientation of the pilot's eyes (e.g., what the pilot is currently looking at).

At a step 510, the PSS determines, based on a sequence of determined gaze targets, a current scan pattern executed by the pilot. For example, the pilot may be directing their gaze toward a first target, then a second target, then other targets in succession, according to a scan pattern.

At a step 512, the PSS determines whether a current scan pattern is nominal or off-nominal according to the current flight context. For example, the PSS may compare a current scan pattern to reference scan patterns appropriate to multiple flight contexts in assessing the current scan pattern as nominal or off-nominal. Reference scan patterns may be applied, e.g., based on the current flight segment or flight conditions; based on whether the subject is seated in a pilot (left-side) or co-pilot (right-side) seat; based on whether the subject is a pilot-in-command or a co-pilot, and/or based on established scan patterns particular to the subject. In some embodiments, a current scan pattern will be evaluated as off-nominal if a nominal scan pattern in progress is interrupted or deviated from, or if the pilot's focus is fixated on an unrelated element for a threshold time (e.g., if the pilot misses a scheduled or periodic scan pattern). In some embodiments, the PSS is in communication with a flight management system (FMS) of the aircraft and receives either a determination of the current flight segment or flight context information allowing the PSS to determine the current flight segment with sufficient confidence.

At a step 514, if a current scan pattern is determined to be off-nominal, the PSS prompts the pilot to redirect their attention. For example, the pilot may simply be prompted to refocus, or directed toward a particular and context-appropriate gaze target.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based pilot safety system (PSS), comprising:
   one or more gaze sensors configured to capture at least one image corresponding to at least one eye of a pilot of an aircraft, the pilot seated in one of a pilot seat or a co-pilot seat within a control area of the aircraft;
   a memory configured for storage of one or more predetermined reference scan patterns associated with the pilot, wherein each reference scan pattern is associated with a flight segment of a flight plan to be executed by the aircraft, and wherein the one or more reference scan patterns include a plurality of reference scan patterns wherein each reference scan pattern is associated with a respective experience level of the pilot;
   and
   one or more processors configured to:
   based on the at least one captured image, determine a gaze direction of the at least one eye;
   map the at least one determined gaze direction to a gaze target associated with the control area;

based on the at least one gaze target, determine a current scan pattern associated with the pilot;

determine whether the current scan pattern is nominal or off-nominal by comparing the current scan pattern to one or more stored reference scan patterns associated with the current flight segment;

and if the current scan pattern is off-nominal, prompt the pilot to redirect their attention.

2. The aircraft-based PSS of claim 1, wherein:

the at least one gaze target is selected from a group including an aircraft display, an aircraft instrument panel, an aircraft indicator, an aircraft subsystem, or an aircraft window.

3. The aircraft-based PSS of claim 1, wherein each reference scan pattern is based on a sequence of two or more reference gaze targets.

4. The aircraft-based PSS of claim 1, wherein:

the one or more processors are in communication with a flight management system (FMS) of the aircraft, the FMS configured to provide flight context information associated with a current flight segment executed by the aircraft;

and the one or more processors are configured to determine the current flight segment based on the received flight context information.

5. The aircraft-based PSS of claim 1, wherein:

the pilot is serving as one of a pilot-in-command (PIC) or a co-pilot;

and the one or more processors are configured to determine whether the current scan pattern is nominal or off-nominal by comparing the current scan pattern to the one or more reference scan patterns associated with the PIC or with the co-pilot.

6. The aircraft-based PSS of claim 1, wherein the one or more processors are configured to:

determine a gaze direction of the at least one eye based on an eye position and an eye orientation of the at least one eye;

and map the at least one determined gaze direction to a gaze target based on at least one of a target position or a target orientation of the gaze target, wherein the at least one of the target position or the target orientation of the gaze target is relative to the eye position and the eye orientation of the at least one eye.

7. The aircraft-based PSS of claim 1, wherein the one or more processors are configured to determine the current scan pattern is off-nominal based on a focus of the at least one eye toward a single gaze target for at least a threshold time window.

8. The aircraft-based PSS of claim 1, wherein the one or more processors are configured to determine the current scan pattern is off-nominal based on at least one of:

a deviation by the pilot from a current scan pattern corresponding to a reference scan pattern;

or an interruption by the pilot of a current scan pattern corresponding to a reference scan pattern.

9. The aircraft-based PSS of claim 1, wherein the PSS is configured to prompt the pilot via at least one of a visual warning or an auditory warning.

10. A method for context-sensitive scan pattern monitoring, the method comprising:

storing to a memory of an aircraft-based pilot safety system (PSS) one or more predetermined reference scan patterns associated with a pilot of an aircraft, the pilot seated in one of a pilot seat or a co-pilot seat, each reference scan pattern associated with a sequence of two or more reference gaze targets and with a flight segment of a flight plan to be executed by the aircraft;

capturing, via one or more gaze sensors disposed within a control area of the aircraft, at least one image corresponding to at least one eye of the pilot, the pilot seated within the control area;

based on the at least one captured image, determining, via the PSS, a gaze direction of the at least one eye;

mapping, via the PSS, the at least one determined gaze direction to a gaze target associated with the control area;

based on the at least one mapped gaze target, determining, via the PSS, a current scan pattern associated with the pilot;

determining, via the PSS, whether the current scan pattern is nominal or off-nominal by comparing the current scan pattern to the one or more reference scan patterns associated with the current flight segment, the one or more reference scan patterns including a plurality of reference scan patterns wherein each reference scan pattern is associated with a respective experience level of the pilot;

and when the current scan pattern is off-nominal, prompting the pilot, via the PSS, to redirect their attention.

11. The method of claim 10, wherein determining, via the PSS, whether the current scan pattern is nominal or off-nominal by comparing the current scan pattern to the one or more reference scan patterns associated with the current flight segment includes:

receiving, via a flight management system (FMS) of the aircraft, flight context information defining the current flight segment.

12. The method of claim 10, wherein the pilot is seated in one of a pilot seat and a co-pilot seat, and wherein:

determining, via the PSS, whether the current scan pattern is nominal or off-nominal by comparing the current scan pattern to the one or more reference scan patterns associated with the current flight segment includes:

determining, via the PSS, whether the current scan pattern is nominal or off-nominal by comparing the current scan pattern to the one or more reference scan patterns corresponding to the one of the pilot seat or the co-pilot seat.

13. The method of claim 10, wherein the pilot is currently serving as one of a pilot-in-command (PIC) or a co-pilot, and wherein:

determining, via the PSS, whether the current scan pattern is nominal or off-nominal by comparing the current scan pattern to the one or more reference scan patterns associated with the current flight segment includes:

determining, via the PSS, whether the current scan pattern is nominal or off-nominal by comparing the current scan pattern to the one or more reference scan patterns corresponding to the one of the PIC or the co-pilot.

14. The method of claim 10, wherein:
determining, via an aircraft-based PSS, a gaze direction of the at least one eye includes determining an eye position and an eye orientation of the at least one eye; and mapping, via the aircraft-based PSS, the at least one determined gaze direction to a gaze target associated with the control area includes comparing the eye position and the eye orientation to at least one or a target position or a target orientation corresponding to a gaze target, the at least one of the target position or the target orientation relative to the eye position and the eye orientation of the at least one eye.

15. The method of claim 10, wherein:
determining, via the PSS, whether the current scan pattern is nominal or off-nominal by comparing the current scan pattern to the one or more reference scan patterns associated with the current flight segment includes:

determining the current scan pattern is off-nominal based on a focus of the at least one eye toward a single gaze target for at least a threshold time window.

16. The method of claim 10, wherein:
determining, via the PSS, whether the current scan pattern is nominal or off-nominal by comparing the current scan pattern to the one or more reference scan patterns associated with the current flight segment includes determining the current scan pattern is off-nominal based on determining at least one of:
a deviation by the pilot from a current scan pattern corresponding to a reference scan pattern;
or
an interruption by the pilot of a current scan pattern corresponding to a reference scan pattern.

* * * * *